Feb. 15, 1966 F. J. COLICKI ETAL 3,234,676

TWO-PIECE SELF-SUPPORTING DISPLAY CARD

Filed March 9, 1964

INVENTORS:
FRANK COLICKI
EDWARD MINKOWSKI
STANLEY BIGG

BY: Arthur J. Hansmann
ATTORNEY

United States Patent Office 3,234,676
Patented Feb. 15, 1966

3,234,676

TWO-PIECE SELF-SUPPORTING DISPLAY CARD

Frank J. Colicki, Edward V. Minkowski, and Stanley D. Bigg, Kenosha, Wis., assignors to Bel-Aire Corporation, Kenosha, Wis., a corporation of Florida Filed Mar. 9, 1964, Ser. No. 350,324
4 Claims. (Cl. 40—124.1)

This invention relates to a display card of the type which can be disposed in either a compact or flat position and in an expanded or standing position. In the latter position the card is therefore self-supporting.

It is an object of this invention to provide a display card which is self-supporting through an improved means wherein the card can be placed in either the compact position or the self-supporting position in a simple and readily accomplishable manner.

A more specific object of this invention is to provide a self-supporting display card wherein the support stand utilizes the arrangement of tabs removably disposed within slits, but the arrangement is such that the tabs are not visible from either the front or the rear of the card. In accomplishing this particular object, the tabs are concealed and therefore firmly disposed in a pocket provided between the front piece and a rear piece forming the card.

Still another specific object of this invention is to provide a self-supporting display card which presents a three-dimensional front piece so that of course the desired picture or the like to be displayed can be attractively displayed and appropriately framed in the three-dimensional setting.

Still another specific object of this invention is to provide a display card which utilizes a three-dimensional front piece and which provides a surface for incorporating writing on the rear of the card even though the three-dimensional front piece would of course be turned downwardly for support of the card in the writing process, and also the arrangement is such that the writing can be concealed even when the card is arranged to be in the self-supporting position. In accomplishing this particular object, it is also a feature that the three-dimensional display card has additional provision for printing on the card in addition to the space for handwriting and thus two types of messages can be included on the card.

Still a further specific object of this invention is to provide a display card which is both three-dimensional and self-supporting and which provides a pocket or the like for receiving a three-dimensional object such as a vial of perfume, a cigar, or other common items of a gift sent and mailable along with the card.

Other object and advantages become apparent upon reading the following description in light of the accompanying drawings wherein.

Figure 1:
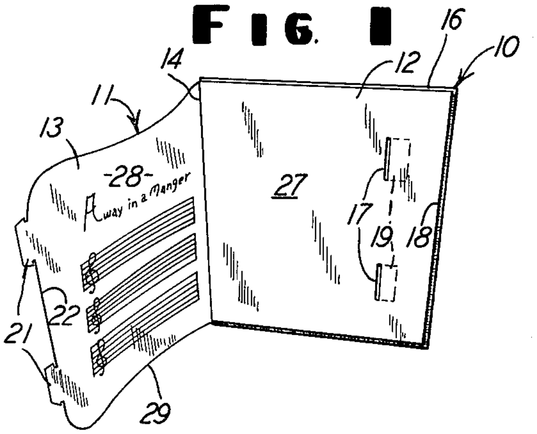
FIG. 1 is a rear perspective view of a display card incorporating a preferred embodiment of this invention and showing the rear piece in the open position.

The display card consists basically of a front piece generally designated 10 and a rear piece generally designated 11. The two pieces are preferably cemented together around the periphery of the right hand portion 12 of the rear piece 11. Thus it will be understood that the rear piece 11 includes the right hand portion 12 and a left hand portion 13 which are defined and divided by a center fold designated 14 and being on the center line of the piece 11. Also the piece 11 is preferably of a stiff paper material or cardboard so that of course it has a flexible nature and can of course be curled into the positions shown in FIGS. 2 and 4 and then present a support or stand for the entire card.

Thus it will also be further understood that the two pieces 10 and 11 are affixed together around the periphery of the rear surface designated 16 of the piece 10 and the mating surface of the portion 12 on the rear piece 11. Thus the central portion of the piece 10 and the center of the portion 12 are not affixed or cemented together, and it will be further noted that the portion 12 has slits 17 extending therethrough adjacent the edge 18 of the portion 12. With the cementing as mentioned, pockets designated 19 are provided between the pieces 10 and 11, and these pockets then receive the tabs 21 on the free edge of the portion 13, as shown in FIGS. 2 and 4.

Figure 2:
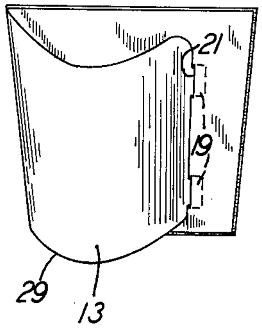
FIG. 2 is a rear perspective view of FIG. 1 but showing the rear piece in the closed position.
Figure 4:
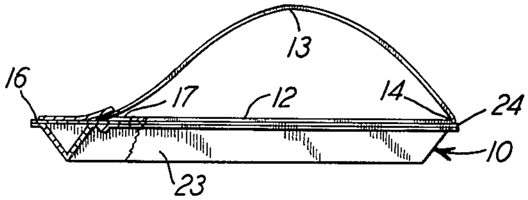
FIG. 4 is a top plan view of FIG. 3 with a fragment thereof broken away.

Thus it will of course be understood that the fold 14 is on the center line of the piece 11, and therefore the tabs 21 on the free edge 22 of the portion 13 are received in the pockets 19 and thereby cause the portion 13 to be curved outwardly as shown in FIGS. 2 and 4 and present the leaning support or stand for the entire card.

Figure 5:
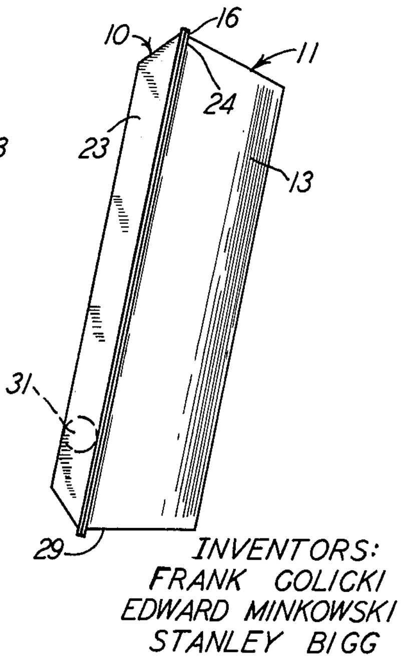
FIG. 5 is a side elevational view of the card shown in FIG. 3 and showing the card tilted back to a self-supporting position.
Figure 3:
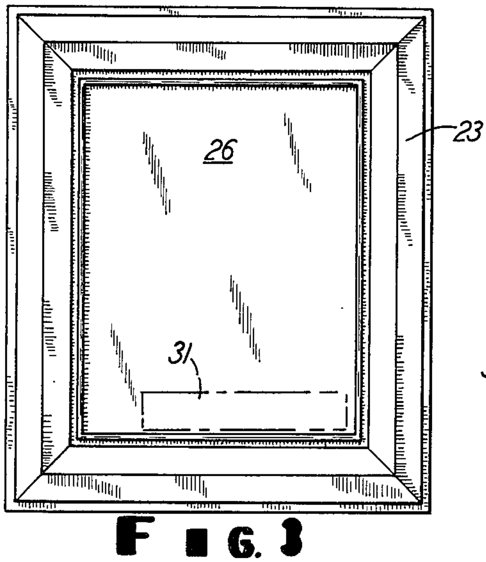
FIG. 3 is a front elevational view of the card shown in FIG. 1, and showing it on an enlarged scale.

FIGS. 4 and 5, particularly, show the front piece 10 to include a three-dimensional member 23 and a planar member 24 which is affixed to the rear side of the member 23. These views also then show that the rear piece 11 has its portion 13 affixed to the member 24, and FIG. 4 shows that the area surrounding the slits 19 and intermediate the portion 12 and the member 24 is not affixed or closed and thus the tabs 21 are disposed in this location or the pocket formed as mentioned.

It will therefore be understood that the face area designated 26 on the front piece member 23 is available for a picture used in the display card, and this picture therefore will be properly framed by the three-dimensional member 23. Also, the rear surface designated 27 of the rear piece 11 in its portion 12 is available for a handwritten message which the sender of the card may desire to write. It will then be noted that when the card is placed in the standing or FIG. 2 position, the handwritten message is concealed as desired. Still further, the surface designated 28 of the portion 13 is available for a printed message such as the music and words to "Away in a Manger" since the piece 11 is cemented to the front piece 10, the piece 11 is of course available for the printing and forming shown so that it will be workable as indicated prior to assembly witb the three-dimensional piece 10.

Also, the lower edge 29 of the portion 13 is arcuate as shown in FIG. 1 so that when the piece is in the spaced-away or extended position of FIG. 2, then it presents a horizontal edge as shown in FIG. 5 and is thus a sturdy support for the entire card.

Still further, because of the three-dimensional nature of the piece 10 a vial indicated 31 of perfume or the like could be disposed in the center portion of the piece 10 and it would of course be adequately received and protected in the piece 10 for packaging and mailing. It is of course to be understood that the piece 10 is of a rigid material so that it will adequately protect the item indicated 31, and it will also give adequate support for writing on the surface 27 when the piece 10 is turned downwardly for the writing support mentioned.

Of course in this construction it will therefore be understood that the distance from the foldline 14 to the slits 17 is less than the length of the portion 13 that is from the foldline 14 to the free edge 22. Also the lengths of the portions 12 and 13 are at least approximately equal. The piece 10 is molded and of a plastic material which is strong enough to support the force created by one writing on the portion 12.

While a specific embodiment of this invention has been shown and described, it should be obvious that certain changes could be made in the embodiment and the invention should therefore be determined only by the scope of the appended claims.

What is claimed is:

1. A display card comprising a face piece including a planar surface on the rear side thereof, a paper folded on the centerline thereof to be divided into two portions on opposite sides of the fold, one of said two portions having a slit therethrough spaced from one edge of said paper and with said paper being affixed to said planar surface in the area surrounding said slit and being free of said planar surface in the adjacent area immediate said slit and being arranged to provide a pocket between said planar surface and said paper in said adjacent area, the other of said two portions including a tab on the free edge thereof opposite the first said free edge, and with said tab being removably concealed in said pocket to fixedly secure the second said free edge to said face piece and dispose the intermediate length of said other portion away from said one portion to provide a stand for said card.

2. A three-dimensional display card comprising a three-dimensional face piece including a planar surface on the rear side thereof, a paper folded on the centerline thereof to be divided into two equal portions on opposite sides of the fold, one of said two portions having a slit therethrough spaced from one edge of said paper and with an area of said one portion being affixed to said planar surface and with another area of said one portion being free of said planar surface in the contiguous area adjacent said slit and being arranged to provide a pocket between said planar surface and said paper in said contiguous area, the other of said two portions including a tab on the free edge thereof opposite the first said free edge, and with said tab being removably concealed in said pocket to secure said other portion of said paper to said face piece and dispose the intermediate length of said other portion away from said one portion to provide a stand for said card.

3. A three-dimensional display card comprising a three-dimensional face piece of a self-supporting stiff material and including a planar surface on the rear side thereof, a paper folded on the centerline thereof to be divided into two equal portions on opposite sides of the fold, one of said two portions having a slit therethrough spaced from one edge of said paper and with said one portion being attached to said planar surface and being free of said planar surface in the contiguous area adjacent said slit and being arranged to provide a pocket between said planar surface and said paper in said contiguous area, said face piece being sufficiently stiff and said one portion being blank both arranged for writing a message on said one portion under the support of said face piece, the other of said two portions including a tab on the free edge thereof opposite the first said free edge of said paper, and with said tab being removably concealed in said pocket to secure said other portion of said paper to said face piece and dispose the intermediate length of said other portion away from said one portion to provide a stand for said card.

4. A display card comprising a face piece including a planar surface on the rear side thereof, a paper folded along a line thereon to be divided into two portions on opposite sides of the fold, one of said two portions having a slit therethrough spaced from one edge of said paper and with said one portion being affixed to said planar surface and being free of said planar surface in the contiguous area adjacent said slit and thereby provide a pocket between said planar surface and said paper in said contiguous area, the other of said two portions including a tab on the free edge thereof opposite the first said free edge of said paper and with said other portion being longer from said fold to said tab than the distance from said fold to said slit, and with said tab being removably concealed in said pocket to secure said other portion of said paper to said face piece and dispose the intermediate length of said other portion away from said one portion to provide a stand for said card.

References Cited by the Examiner

UNITED STATES PATENTS

| | | | |
|---|---|---|---|
| 2,080,997 | 5/1937 | Beckelman | 40—126 |
| 2,255,535 | 9/1941 | Sauer | 40—124.1 |
| 3,015,898 | 1/1962 | Keesler | 40—124.1 |

FOREIGN PATENTS

| | | |
|---|---|---|
| 873,204 | 7/1961 | Great Britain. |

EUGENE R. CAPOZIO, *Primary Examiner.*

WENCESLAO J. CONTRERAS, *Assistant Examiner.*